(12) United States Patent
Gilbert

(10) Patent No.: US 7,290,433 B2
(45) Date of Patent: Nov. 6, 2007

(54) METHOD AND DEVICE FOR CHECKING A SENSOR

(75) Inventor: René Gilbert, Dardilly (FR)

(73) Assignee: Framatome ANP, Courbevoie (FR)

( * ) Notice: Subject to any disclaimer, the term of this patent is extended or adjusted under 35 U.S.C. 154(b) by 210 days.

(21) Appl. No.: 10/469,604

(22) PCT Filed: Feb. 25, 2002

(86) PCT No.: PCT/FR02/00688

§ 371 (c)(1),
(2), (4) Date: Feb. 5, 2004

(87) PCT Pub. No.: WO02/070995

PCT Pub. Date: Sep. 12, 2002

(65) Prior Publication Data

US 2004/0123641 A1 Jul. 1, 2004

(30) Foreign Application Priority Data

Mar. 2, 2001 (FR) .................................. 01 02910

(51) Int. Cl.
*G01N 25/00* (2006.01)
(52) U.S. Cl. ........................................ 73/1.02; 73/1.03
(58) Field of Classification Search ........ 73/1.63–1.68, 73/1.02–1.05, 1.19, 1.25; 374/1
See application file for complete search history.

(56) References Cited

U.S. PATENT DOCUMENTS

| 3,318,134 | A | * | 5/1967 | Stempel et al. ................. 374/2 |
| 3,605,480 | A | * | 9/1971 | St. Clair ...................... 73/1.25 |
| 4,102,175 | A | * | 7/1978 | Foster ......................... 73/1.67 |
| 4,339,943 | A | * | 7/1982 | Hedrick ....................... 73/1.63 |
| 4,507,952 | A | * | 4/1985 | Mathieu ....................... 73/1.19 |
| 4,570,476 | A | * | 2/1986 | Davis .......................... 73/1.02 |
| 4,825,685 | A | * | 5/1989 | Breimesser ................... 73/727 |
| 4,832,900 | A | * | 5/1989 | Harbaugh et al. ........ 73/1.63 X |
| 6,134,941 | A | * | 10/2000 | Cripe et al. ................. 73/1.02 |
| 6,629,447 | B1 | * | 10/2003 | Collins ..................... 73/1.19 X |
| 6,694,796 | B2 | * | 2/2004 | Juneau et al. ............... 73/1.03 |
| 6,843,099 | B2 | * | 1/2005 | Derek et al. ............... 73/19.01 |
| 6,938,456 | B2 | * | 9/2005 | Tetreault et al. ........ 73/1.64 X |

FOREIGN PATENT DOCUMENTS

EP 264554 A1 * 4/1988 ................. 73/1.03

(Continued)

*Primary Examiner*—Thomas P. Noland
(74) *Attorney, Agent, or Firm*—Connolly Bove Lodge & Hutz LLP

(57) ABSTRACT

In an industrial installation equipped with a sensor, a method is provided for checking the sensor and providing a measurement sequence associated with the sensor. Monitoring occurs for a thermodynamic parameter of a monitored fluid circulating in the industrial installation, by sensing the fluid using the sensor while the industrial installation is operating and by collecting and processing an electric signal emitted by the sensor using the measurement sequence. A perturbation is produced of fluid origin of the thermodynamic parameter while the installation is operating and the fluid circulates in the installation in order to act on a sensitive element of the sensor and cause a modification of the electric signal emitted by the sensor. The method performs collecting and analyzing of the modified signal from the sensor using the measurement sequence.

21 Claims, 6 Drawing Sheets

FOREIGN PATENT DOCUMENTS

| | | | |
|---|---|---|---|
| EP | 568610 B1 * 3/1997 | | |
| FR | 2582400 A1 * 11/1986 | ................. | 73/1.63 |
| GB | 2278203 * 11/1994 | ................. | 73/1.03 |
| JP | 57033336 A * 2/1982 | ................. | 73/1.66 |
| JP | 59079119 A * 5/1984 | ................. | 73/1.66 |
| WO | WO 9308454 A1 * 4/1993 | ................. | 73/1.66 |

* cited by examiner

METHOD AND DEVICE FOR CHECKING A SENSOR

FIELD OF THE INVENTION

The invention relates to a method and a device for checking a sensor for measuring a thermodynamic parameter of a fluid in an industrial installation, in which the sensor is used only under certain circumstances, and a measurement sequence associated with the sensor.

BACKGROUND OF THE INVENTION

In industrial installations, use is generally made for monitoring the installation of measurement sensors supplying information about various parameters representing the running of a process within the industrial installation.

Customarily, industrial installations using at least one fluid involved in the process performed comprise sensors for measuring thermodynamic parameters of the fluid, such as pressure sensors, flow sensors, temperature sensors or fluid level sensors. In particular, in nuclear power stations, use is made of numerous sensors which measure and monitor thermodynamic parameters of a heat exchange fluid of the nuclear power station.

Certain sensors are used only when the nuclear power station experiences an incident or when an accident occurs, or alternatively, during phases of limited duration while the power station is operating.

Such sensors are associated with a measurement sequence that allows an electric signal supplied by the measurement sensor to be collected and processed.

When it is necessary to have a sensor and its measurement sequence available in a situation where an incident or an accident has occurred, information is not generally available that will make it possible to guarantee that the sensor and its measurement sequence are actually available to supply the necessary information. This is because the availability tests performed on the sensors and their measurement sequence may have been carried out in a period very far removed, in terms of time, from the time when use of the sensor becomes necessary. For example, the situation may arise where the availability tests on the sensors of a nuclear power station were performed before the power station was started up, and the use of the sensors if an incident or accident occurs arises only a very long time after the power station has been started up, for example a year or more after start-up.

In certain situations it is absolutely essential to have sensors and their measurement sequence available, even though it is not possible to obtain information regarding the availability of these sensors and measurement sequences while the installation is operating.

In certain industrial installations, particularly in nuclear power stations, availability tests are carried out periodically on the monitoring sensor measurement sequences, but these tests relate only to the electrical part of the measurement sequence and do not allow the influence on the sensor of a thermodynamic parameter of a fluid present inside the industrial installation to be verified. It is therefore not possible to be sure that the sensors and their measurement sequence are capable, at a given moment, of supplying the information that is essential if the industrial installation experiences abnormal operating conditions.

As a result, and in particular in the case of nuclear power stations, it has proved to be extremely desirable to have a method for checking the availability of sensors on the nuclear power station in operation that can be carried out at any time.

Hitherto such a method for checking sensors and in particular for checking sensors that measure and monitor thermodynamic parameters of a fluid in a nuclear power station while it is operating has not been available.

In order to make functional checks on the sensor itself, independently of its measurement sequence, tests are carried out on test benches, after the sensor has been removed from the installation. Such a method does not allow the sensor itself and its measurement sequence to be checked simultaneously.

In U.S. Pat. No. 4,825,685 the pressure of a fluid in a chamber of a sensor in contact with a sensitive element of the sensor is modulated using a piezoelectric element placed in the chamber of the sensor. The modulating of the pressure, in order to check the sensor, entails energizing the piezoelectric element with an electric current, and this may present disadvantages in certain applications.

BRIEF DESCRIPTION OF THE INVENTION

The object of the invention is therefore to propose a method for checking a sensor that monitors a thermodynamic parameter of a fluid in an industrial installation and a measurement sequence associated with the sensor for collecting and processing an electric signal emitted by the sensor, it being possible for this method to be employed on the industrial installation while it is operating, at any time.

To this end, there is produced a perturbation of fluid origin acting on a sensitive element of the sensor and leading to a modification of the electric signal from the sensor, and the modified signal from the sensor is collected and analyzed using the measurement sequence.

In order to allow a clear understanding of the invention, a sensor and its measurement sequence and several embodiments of the checking method according to the invention will now be described by way of example with reference to the appended figures.

DETAILED DESCRIPTION OF THE INVENTION

Figure 1:
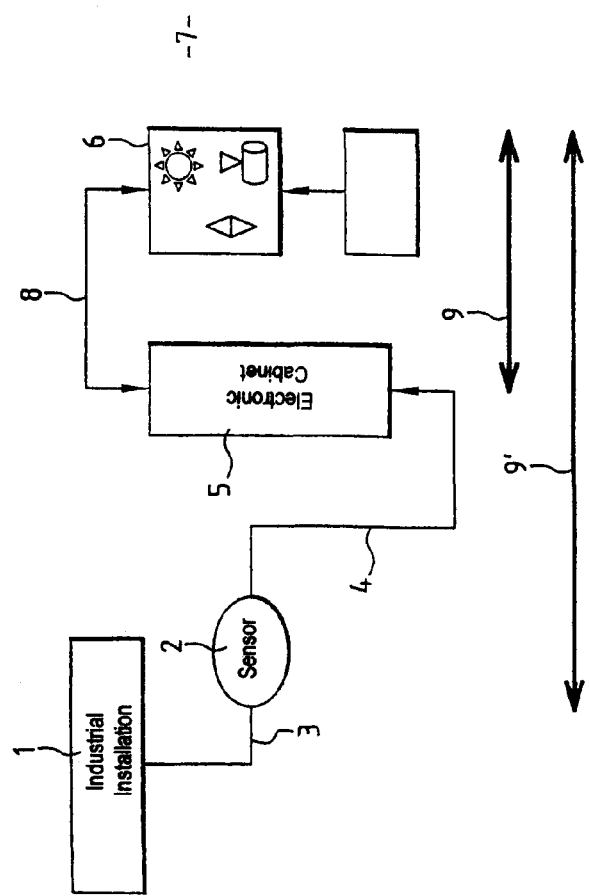
FIG. 1 is a diagram showing a sensor and its measurement sequence.

FIG. 1 depicts, symbolically, the industrial installation 1 in which there is carried out a method employing at least one fluid of which a thermodynamic characteristic is measured, from a sensor 2 connected to the installation 1 by an instrumentation pipe run 3, generally known as "tubing".

The sensor 2 is connected, by an electrical measurement line 4, to an electronic cabinet 5 in which the electric signals emitted by the sensor 2 in response to influences dependent upon the thermodynamic parameter of the fluid are collected and processed to provide a measurement of the thermodynamic parameter or a signal which is transmitted to a monitoring panel or screen of a control unit 6 in the control room 7 of the installation 1, for example the control room of a nuclear power station constituting the installation 1.

In the context of the implementation of a method for testing a sensor 2 and its measurement sequence 4, 5 according to the known method, an electric signal with a given voltage and/or current is passed into the measurement sequence comprising the electronic cabinet 5 via a connecting line 8 between the control unit 6 in the control room 7 and the electronic cabinet 5.

The electric signal transmitted to the electronic cabinet 5 simulates a measurement signal from the sensor 2, making it possible to check the behavior of the downstream part of the measurement sequence comprising the means that exploit the electric signal from the sensor.

Voltage or current modulation of the electric signal transmitted to the electronic cabinet 5 makes it possible to simulate response signals from the sensor 2 under various influencing conditions.

This measurement method allows only the downstream part of the measurement sequence comprising the electronic cabinet 5, the connecting line 8 and the control unit 6 to be tested, as depicted schematically by segment 9 in FIG. 1.

As will be explained later on, the method according to the invention employs an influence of fluid origin applied directly to the sensor 2 so that analysis of the electric signal from the sensor perturbed by the influence of fluid origin applied to the sensor enables the entirety of the measurement sequence to be checked, from the sensor 2 as far as the control and monitoring unit 6, as shown schematically by the arrow 9' in FIG. 1.

Figure 2:
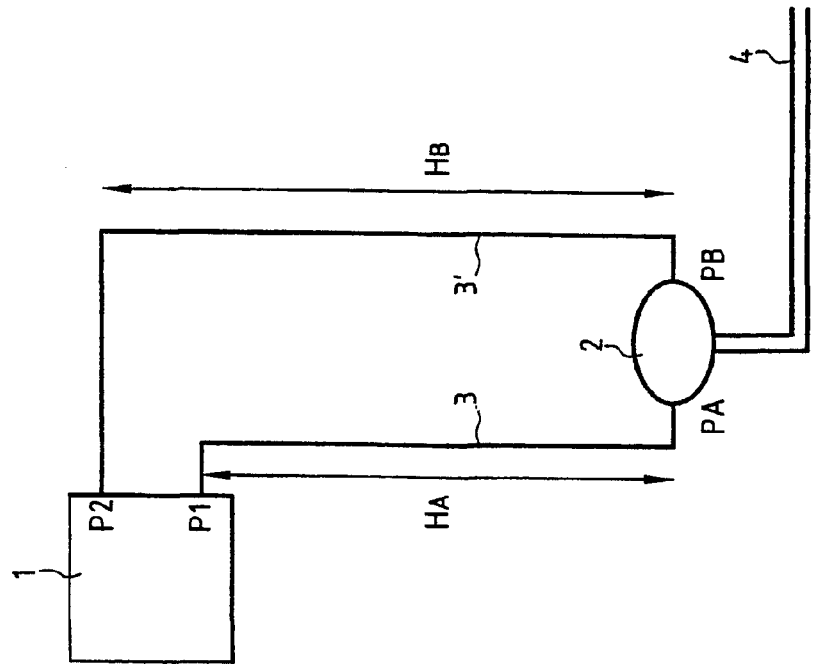
FIG. 2 is a diagram showing the operation of a sensor for measuring a thermodynamic parameter.

FIG. 2 schematically depicts a sensor 2 for measuring thermodynamic parameters of a fluid in an installation 1 such that a heat exchange circuit or a volume of a nuclear power station.

The sensor 2 is connected to the circuit of the nuclear power station by a single measurement tube 3 or by two measurement tubes 3 and 3', depending on the nature of the measurement performed in the circuit of the installation 1.

When the measurement is that of a level or a flow rate, the sensor 2 is connected to the circuit of the nuclear power station 1 by a first supply pipe run 3 connected to the circuit of the power station by a first tapping and by a second instrumentation pipe run 3' connected to the circuit of the power station by a second tapping.

When the pressure or temperature of the fluid in the circuit 1 of the nuclear power station is being measured, the sensor 2 may be placed in communication with the circuit by a single instrumentation pipe run connected to the circuit of the power station by a single tapping.

The sensor 2 is connected by an electric line 4 to an electronic cabinet, not depicted, in which the electric signal from the sensor is collected and processed.

If the pressures at the terminals of the sensor connected to the instrumentation pipe runs 3 and 3' are denoted $P_A$ ad $P_B$ respectively, then the signal S from the sensor is representative of $S=P_A-P_B$.

If the static pressure heads, with respect to the sensor 2, of the tapping points of the circuit at which the pressures $P_1$ and $P_2$ are measured are denoted $H_A$ and $H_B$, and the mass per unit volume of the fluids in the instrumentation pipe runs 3 and 3' are denoted $m_A$ and $m_B$, then the pressures $P_A$ and $P_B$ are expressed by the formulae $P_A=P_1+H_A m_A$, $P_B=P_2+H_B m_B$.

From this, it can be deduced that:

$$S=P_1-P_2+H_A m_A-H_B m_B.$$

From the signal S from the sensor, it is possible to determine the difference in level between the two tapping points on the circuit ($P_1-P_2$=hm) and the fluid flow rate D in the circuit 1 from $P_1-P_2=\Delta P$.

In order to take a pressure measurement $P_1$ or $P_2$ at a point on the circuit, the sensor 2 may be connected to the circuit, via a single instrumentation pipe run and a single tapping.

Figure 3B:
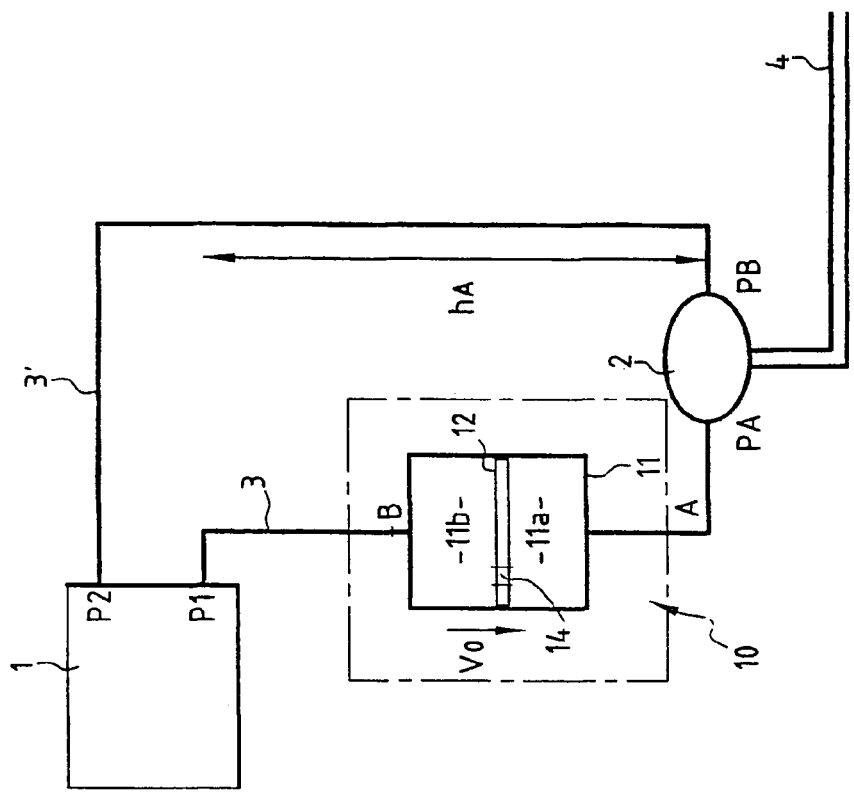
FIG. 3B is a schematic view showing an alternative form of the test device depicted in FIG. 3A.
Figure 3A:
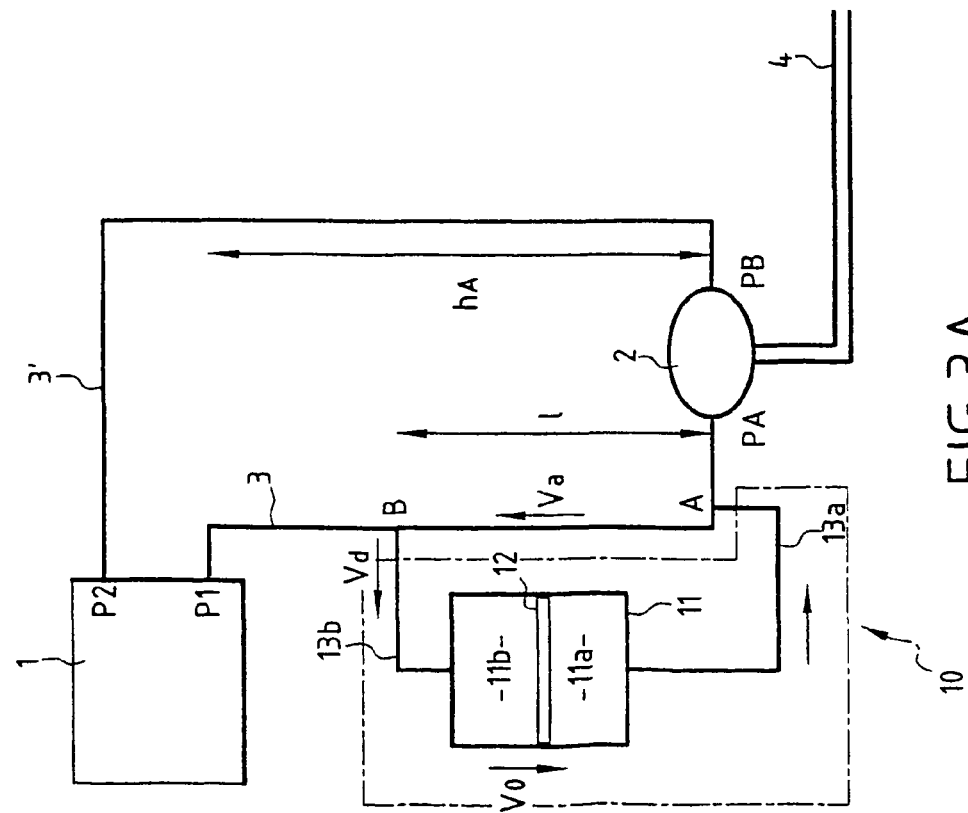
FIG. 3A is a schematic view of a device for testing a sensor for implementing the method according to the invention and according to a first embodiment.

FIGS. 3A and 3B symbolically depict the circuit 1 of the installation in which a measurement is made, the sensor 2, the instrumentation pipe runs 3 and 3' connected to the sensor 2 and the electric measurement line 4.

Also depicted is a test device for employing the method according to the invention according to a first embodiment (FIG. 3A) and according to an alternative form (FIG. 3B).

In FIG. 3A, the test device, denoted in general by the reference 10 and depicted inside a dotted line comprises a closed cylinder 11 in which there moves a piston 12 delimiting a first chamber 11a and a second chamber 11b inside the closed cylinder.

The first chamber 11a of the cylinder, on one side of the piston 12, is connected by a pipe 13a to the instrumentation pipe run 3, in an arrangement close to the terminal of the sensor 2, which terminal is connected to the pipe run 3.

The chamber 11b is likewise connected, by a pipe 13b, to the instrumentation pipe run 3 in a zone of the pipe 3 further away from the sensor 2.

The pipes 13a and 13b connecting the chambers of the cylinder to the instrumentation pipe run 3 have a diameter D appreciably greater than the diameter d of the instrumentation pipe run 3. The length of the instrumentation pipe run 3 between the point A where it joins the pipe 13a and the point B where the pipe 13b joins the instrumentation pipe run 3 is denoted l.

As in the case of the measurement device depicted in FIG. 2 described above, the difference in level between the sensor 2 and the point where the instrumentation pipe run joins the circuit of the installation 1, at the level of which the fluid pressure is the pressure $P_1$, is denoted $h_A$.

When the piston 12 is moved at a certain speed $V_0$ (arrow $V_0$ in FIG. 3), liquid is displaced inside the cylinder, in the pipe 13a, the instrumentation pipe run 3, and the pipe 13b returning to the chamber 11b of the cylinder 11.

Process fluid is thus displaced at a speed $V_a$ in the length of pipe AB, the physical length of which is l.

Because the pressure drop in the small-diameter pipe run 3 is very much greater than the pressure drop in the large-diameter pipes 13a and 13b, a raised pressure is created at the point A and this is detected by the sensor 2 in the form of a signal transmitted by the electric measurement line 4 to the measurement room.

It can thus be determined, when the perturbed electric signal from the sensor due to the pressure perturbation in the instrumentation pipe run 3 is picked up, whether the sensor 2 and its measurement sequence are available to detect perturbed operating conditions of the installation.

This check is performed without shutting down the installation and without disrupting the measurements that are performed continuously, because the perturbation introduced by the displacement of fluid by the piston 12 can be small by comparison with the pressure signal measured by the sensor.

If the installation is operating under normal conditions the pressure $P_A$ measured by the sensor is given by the formula:

$$P_A = P_1 + h_A \cdot m_A.$$

In a test situation, the piston 12 being displaced to create a circulation of fluid at a speed $V_A$ in the instrumentation line, the pressure $P_A$ becomes:

$$P_A = k \cdot l \cdot V_A^2 + P_1 + h_A \cdot m_A,$$

the coefficient k is given by the formula $k=f(d,m_A,g)$, this coefficient k being the headloss coefficient for the instrumentation pipe run 3. This coefficient is determined according to the diameter d of the instrumentation pipe run (the diameter d is very much smaller than the diameter D of the pipes 13a and 13b), of the specific mass $m_A$ of the fluid and of the acceleration due to gravity g.

It can be deduced from the above formulae that the perturbation introduced, which is the difference between the pressure under normal circumstances and the pressure under test circumstances, measured by the sensor 2, is equal to $k \cdot l \cdot V_A^2$.

The perturbation is dependent in particular upon the length of the pipe run between the points A and B and upon the speed of the fluid in this part of the instrumentation pipe run.

The method according to the invention therefore consists in creating a temporary raised pressure in the instrumentation pipe run and in using the measurement sequence to pick up the electric signal modified by the perturbation.

The sensor 2 and its measurement sequence can thus be tested in a single operation by introducing a physical perturbation in the fluid, which perturbation is transmitted to the sensitive element of the sensor.

When a pressure is being measured, the process circuit 1 may be connected to the sensor by a single instrumentation pipe run 3 and the perturbation is manifested in an increase in pressure at the point A of the instrumentation pipe run, the value of which was given above and which is detected by the sensor 2.

As indicated above, by using a second instrumentation pipe run 3' connected to the sensor at a second point 2 in the circuit 1 of the process, it is possible to take level and flow rate measurements using the sensor 2.

As in the case of a pressure measurement, circulating fluid using the piston 12 of the cylinder 11 makes it possible to generate an increase in pressure at the point A in the instrumentation pipe run 3 and a modification to the electric signal can be detected by the measurement sequence.

It is possible to use a first test device 10 placed on the instrumentation pipe run 3, as described above, and a second test device placed on the second instrumentation pipe run 3'. In this case, as the sensor 2 works as a differential sensor, the effect obtained by the first device 10 can be combined with the effect obtained by the second device placed in parallel on the instrumentation pipe run 3', in order to increase the difference by comparison with the value read under normal operating conditions, of the signal emitted by the sensor and the measurement sequence.

By combining the effects obtained from the two test devices it is possible to provide several levels at which the sensor is influenced during the test phase.

It is thus possible to envision calibrating the sensor, if the influence levels can be measured, for example in the form of pressure drops or pressures, which are matched up with the signals from the sensor.

As depicted in FIG. 3B, it is possible to obtain a perturbation with a piston interposed on a pipe run or placed inside a pipe run communicating with the fluid circuit and, for example, inside an instrumentation pipe run such as 3 or 3'. The piston is pierced with a calibrated orifice 14, so that the fluid circuit 1 can be made to communicate with the sensor 2 through the piston 12 when the installation is operating normally, the piston 12 being at rest; when the sensor is being tested by moving the piston 12, the calibrated orifice 14 acts as a pressure-reducing member.

When the piston is made to move in one direction or the other in the pipe run, the pressure in contact with the sensitive element of the sensor is thus increased or decreased depending on the direction in which the piston moves, and the signal from this sensor is thus perturbed. The increase in pressure or the reduction in pressure in the part of the pipe run in which the sensor is located is then reabsorbed by the passage of fluid through the orifice in the piston. It is thus possible to check the levels of protection generated by the measurement sequence.

Figure 4A:
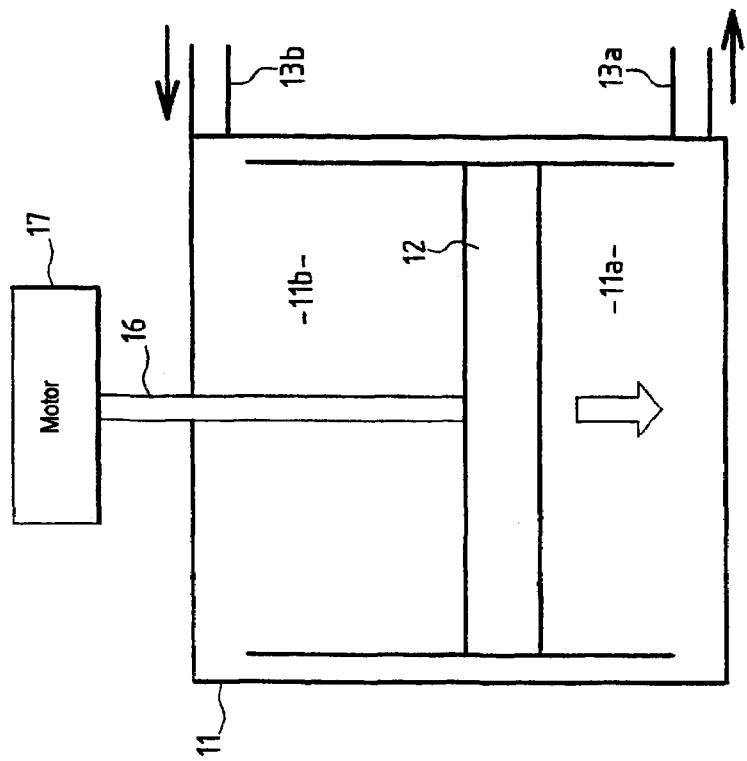
FIGS. 4A and 4B show means for controlling a piston of the device depicted in FIG. 3, in two alternative forms of embodiment.
Figure 4B:
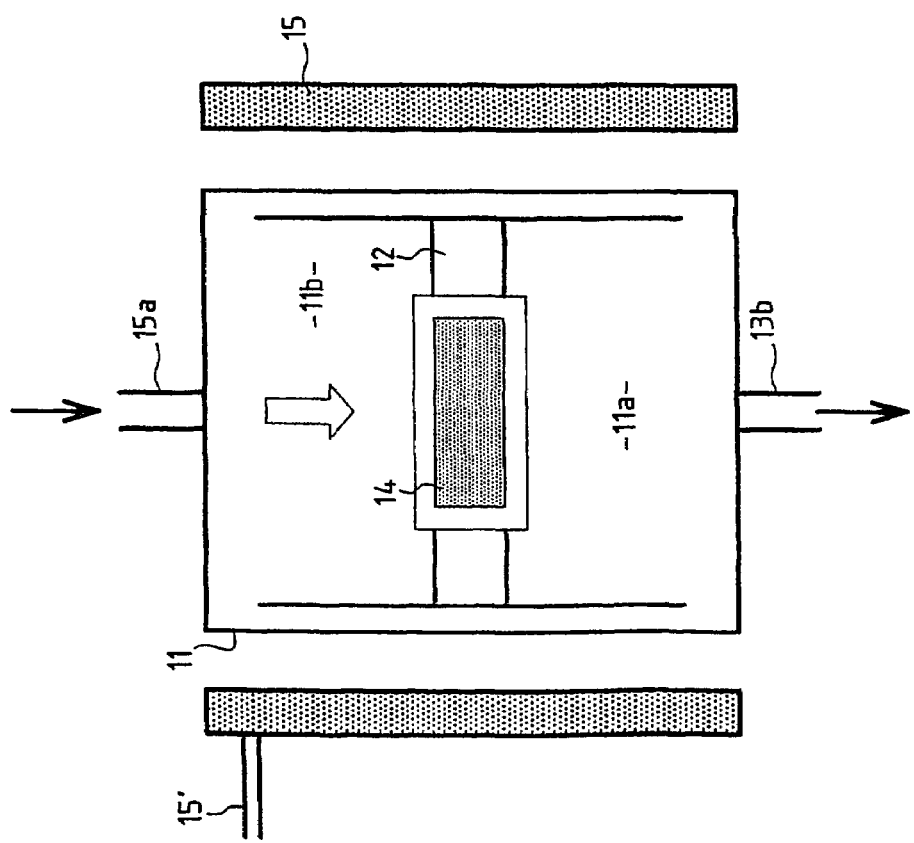

As can be seen in FIGS. 4A and 4B, the piston 12 can be made to move inside the cylinder 11 in at least two different ways.

In the case depicted in FIG. 4A, a magnetic core plunger 14 is fixed to the piston 12 inside the cylinder 11 and a magnetic coil 15 is placed on the outside of the cylinder 11, for example coaxial with the cylinder 11. The magnetic coil 15 connected to an electric power supply by a conductor 15' causes the piston to move in one direction or the other, in the axial direction of the cylinder 11, thus causing fluid to be displaced into the pipes 13a and 13b of the test device. This device has the advantage of requiring no mechanical connection between the piston 12 and movement means situated outside the cylinder 11.

This contactless way of embodying the piston movement means is particularly suited to cases where use is made of a piston mounted freely inside a pipe run, for example an instrumentation pipe run containing the fluid on which the measurement is made.

In the case depicted in FIG. 4B, the piston 12 is connected via a rod 16 to a servomotor 17 for moving the rod 16 and the piston 12 in the axial direction of the cylinder 11, to cause fluid to be displaced into the pipes 13a and 13b of the test device which are connected to the instrumentation pipe run on which the sensor is placed.

This device entails the use of a servomotor outside the cylinder 11 and of a sealed passage for the rod 16 through an end wall of the cylinder 11.

In the case of the embodiment of a test device 10 as depicted in FIGS. 3A and 3B, the circuit of the test device causing the perturbation in the instrumentation pipe run is completely closed, which means that no external fluid is introduced into the test device, when testing the sensor.

Figure 5:
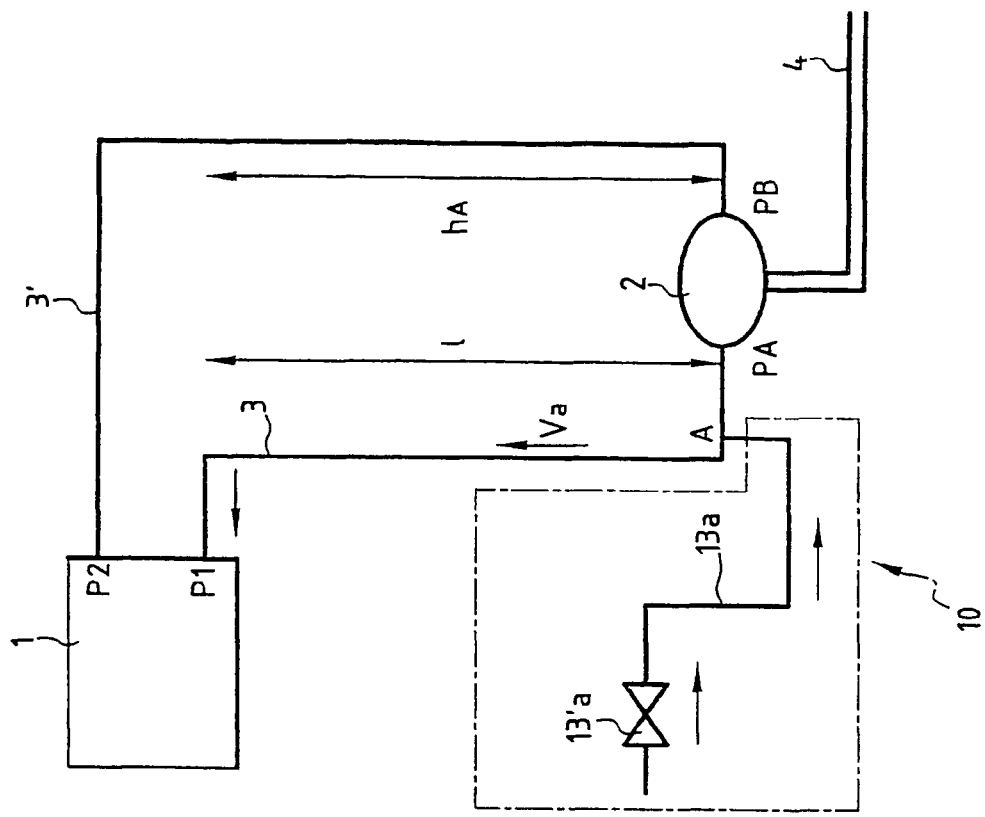
FIG. 5 is a diagram showing a test device for implementing the method according to the invention and according to a second embodiment.

In the case of the test device 10 depicted in FIG. 5, the elements that correspond in FIGS. 3A, 3B and 5 bearing the same references, a perturbation is created in the instrumentation pipe run 3 by a pipe 13a on which a shut-off valve 13'a is arranged and a pipe 13b on which a shut-off valve 13'b is placed.

The pipe 13a can be connected to a source of fluid the pressure of which is slightly higher than the pressure $P_A$ of the fluid in the instrumentation pipe run 3, that is to say the working pressure of the fluid circuit 1 of the process.

By opening the valves 13'a and 13'b fluid is injected at A into the instrumentation pipe run, fluid being withdrawn via the pipe 13b, so that, as in the case of the device depicted in FIG. 3A, fluid is circulated at a speed $V_A$ through the length AB of the instrumentation pipe run 3 and a perturbation $k \cdot l \cdot V_A^2$, consistent with a pressure, is introduced into the instrumentation pipe run 3. This perturbation, which is applied to the sensor 2 in the form of a raised pressure, leads to a modification in the electric signal transmitted by the measurement sequence to the control room.

Unlike the embodiment depicted in FIGS. 3A and 3B, the fluid injected into the instrumentation pipe run 3 comes from a source independent of the process circuit 1 and of the instrumentation pipe run or runs.

As before, the tubes 13a and 13b have a diameter D very much greater than the diameter d of the instrumentation pipe run 3, and in the case of a differential sensor 2 connected by instrumentation pipe runs 3 and 3' to the process circuit 1, use may be made of two test devices similar to the device 10 produced in open circuit.

The test device depicted in FIG. 5 can also be used for level or flow rate measurements just as easily as it can for pressure measurements.

The test device could also be used for measuring temperature, by injecting into the circuit a fluid at a temperature different from the temperature of the process circuit.

Figure 6:
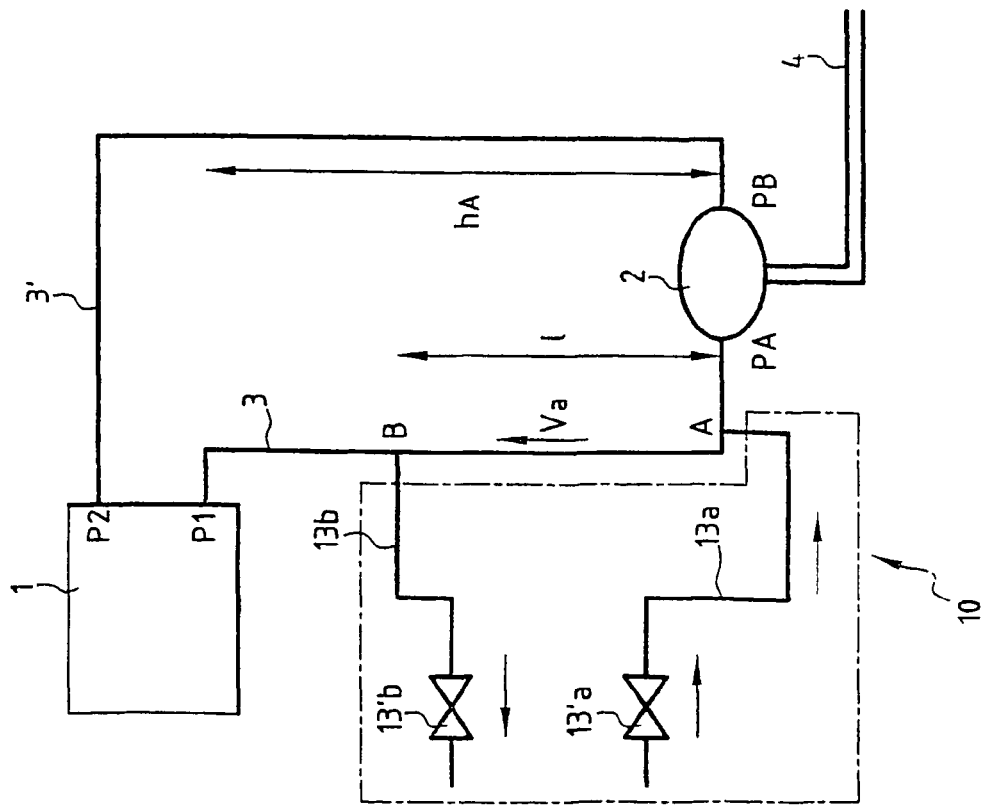
FIG. 6 is a diagram showing a test device for implementing the method according to the invention and according to a third embodiment.

FIG. 6 depicts an alternative form of the test method and device depicted in FIG. 5.

The test device 10 comprises a single pipe 13a on which a shut-off valve 13'a is arranged, the pipe 13a, with a diameter D very much greater than the diameter d of the instrumentation pipe run 3, being connected to the instrumentation pipe run at a point A close to one of the terminals of the sensor 2.

The pipe 13a may be connected to an external source, such as a reservoir, containing a fluid similar to the fluid of the circuit 1 of the industrial installation or a fluid compatible with this fluid.

To create a perturbation in the instrumentation pipe run 3 manifested as an increase in pressure at a point adjacent to the sensor 2, the shut-off valve 13'a is opened so as to inject fluid into the instrumentation pipe run 3. The fluid circulates at a speed $V_A$ in the pipe run 3, which means that a perturbation manifested as an increase in pressure $k \cdot l \cdot V_A^2$ is introduced in the vicinity of the sensor 2.

This perturbation produces a modified electric signal which enables the operation of the sensor 2 to be verified.

Instead of injecting a fluid into the instrumentation pipe run 3 using the pipe 13a, fluid may be withdrawn if the fluid circuit 1 and the instrumentation pipe run 3 are at a raised pressure compared with the part of the pipe 13a downstream of the shut-off valve 13'a which may be connected to a reservoir for collecting fluid.

In this case, a reduced pressure is introduced in the vicinity of the sensor 2 and fluid is circulated in the instrumentation pipe run at a speed $V_A$ in the opposite direction to the direction indicated in FIG. 6.

The perturbation introduced is manifested by a reduction in pressure $k \cdot l \cdot V_A^2$ which is detected by the measurement sequence. In this way, the sensor 2 is checked.

In the case of the embodiments of the test method and device according to the invention which are depicted in FIGS. 3A, 3B, 5 and 6, a perturbation is introduced only into the instrumentation pipe run, the fluid circuit of the industrial installation being monitored experiencing no perturbation.

Figure 7A:
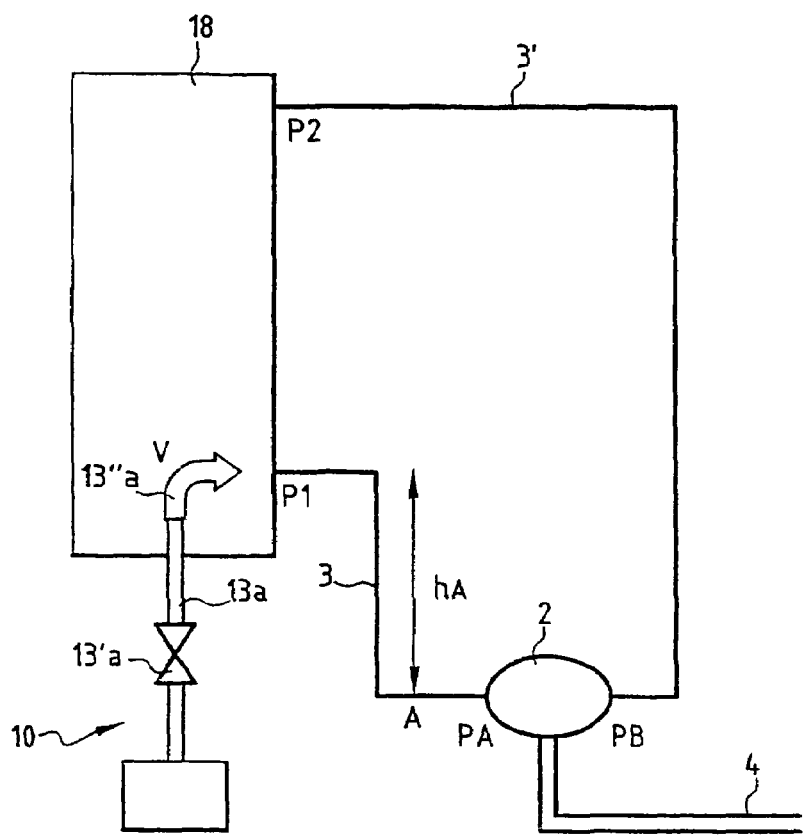
FIG. 7A is a schematic view of a test device according to the invention and according to a fourth embodiment.
Figure 7B:
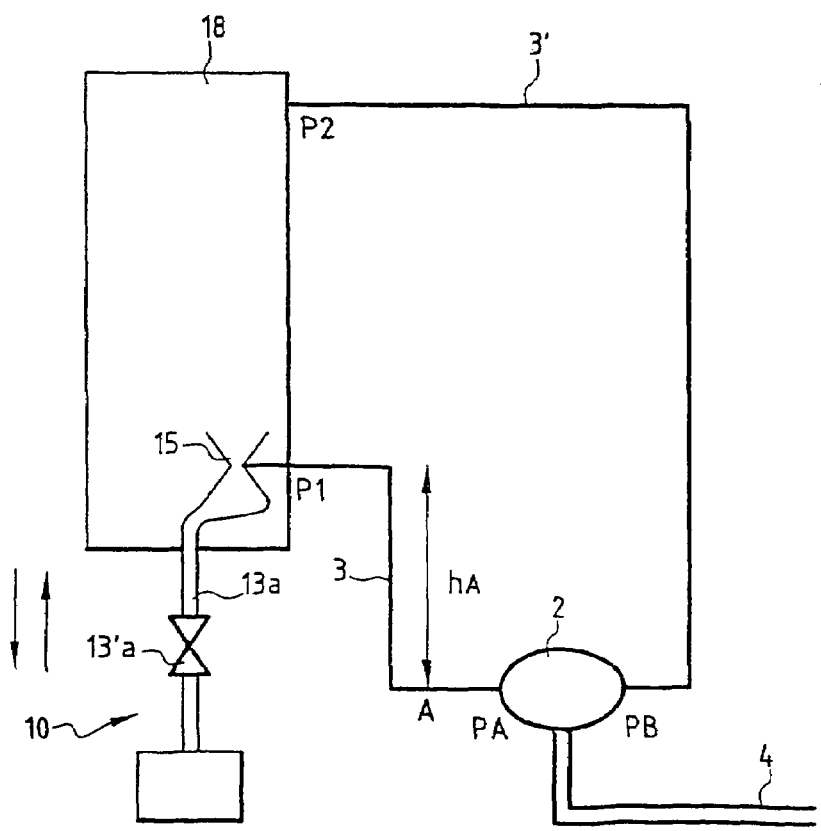
FIG. 7B is a schematic view showing an alternative form of the test device depicted in FIG. 7A.

In the case of the embodiment depicted in FIGS. 7A and 7B, a perturbation is introduced into the zone that is to be monitored.

FIG. 7A depicts a fluid reservoir 18, in which a level is measured, a pressure is measured at a point on the reservoir, or a differential pressure $P_2 - P_1$ is measured between first and second points of the reservoir 18.

Use is made of a sensor 2 connected to the reservoir 18 by the instrumentation pipe run 3 in order to take the pressure measurement $P_A$:

$$P_A = P_1 + h_A \cdot m_A$$

and possibly a second pressure measurement $P_2$, the second terminal of the sensor 2 being connected to the reservoir 18, at a level above the level of the instrumentation pipe run 3, by a second instrumentation pipe run 3'.

The sensor 2 is connected by an electric connecting line 4 to means for processing and exploiting the signal from the sensor, which means constitute the measurement sequence for the sensor 2.

Use is made of a test device 10 for testing the sensor 2 and its measurement sequence comprising a pipe 13a passing through the wall of the reservoir 18 in a sealed manner and comprising, at one end situated inside the reservoir 18, roughly level with the point of connection of the instrumentation pipe run 3 to a tapping of the reservoir 18, an injection nozzle 13"a.

Also arranged on the pipe 13a, outside the reservoir 18, is a shut-off valve 13'a.

Upstream of the shut-off valve 13'a, the pipe 13a of the test device may be connected to a reservoir containing a fluid at a pressure higher than the pressure of the fluid in the reservoir 18, at the tapping of the instrumentation pipe run 3.

In order to test the sensor 2 and its measurement line, the shut-off valve 13'a is opened so that a jet of fluid is injected through the nozzle 13"a into the reservoir 18 at and in the continuation of the tapping connecting to the instrumentation pipe run 3.

The perturbation introduced into the fluid in the reservoir corresponds to the impulse of the jet of fluid injected at a speed V through the pipe 13a and the nozzle 13"a into the reservoir 18. This impulse consistent with a pressure has the value $\frac{1}{2} m_A V^2$, with $m_A$ the mass per unit volume of the fluid (fluid similar to the fluid in the reservoir 18 or a compatible fluid) and V the speed of the fluid injected at the tapping of the instrumentation pipe run 3.

In the course of the test, the pressure $P_A$ measured by the sensor is given by the formula:

$$P_A = \tfrac{1}{2} m_A \cdot V^2 + P_1 + h_A \cdot m_A,$$

where $h_A$ denotes the static pressure head between the sensor and the tapping of the instrumentation pipe run 3.

As before, the test device can be used to check a pressure sensor 2 and its measurement sequence, the sensor measuring the pressure $P_1$ in the reservoir 18, or alternatively to measure the level or the flow rate from the differential pressure $P_2-P_1$ between the points of the reservoir 18 at the tappings of the first instrumentation pipe run 3 and the second instrumentation pipe run 3', respectively.

As depicted in FIG. 7B, instead of injecting fluid into the reservoir 18, fluid may be withdrawn from the reservoir 18 at a speed V by opening the shut-off valve 13'a of the pipe 13a opening into a reservoir at a pressure lower than the pressure in the reservoir 18 at the tapping of the instrumentation pipe run 3. In this case, use is made of a venturi 15 at the end of the pipe 13a to create a reduced pressure of magnitude $\frac{1}{2} m_A V^2$ in the reservoir 18 at the tapping of the instrumentation pipe run 3 connected to the throat of the venturi 15.

Instead of withdrawing fluid into the reservoir 18, fluid may also be injected at a speed V through the venturi 15.

In the case of injection, a raised pressure equal to $\frac{1}{2} m_A V^2$ is created.

The method for checking a sensor and its measurement sequence according to the invention can be employed not only by exerting a perturbation of fluid origin on the fluid whose sensor measures a thermodynamic characteristic but also by moving the sensor itself, within the fluid, in order to create the perturbation.

Figure 8A:
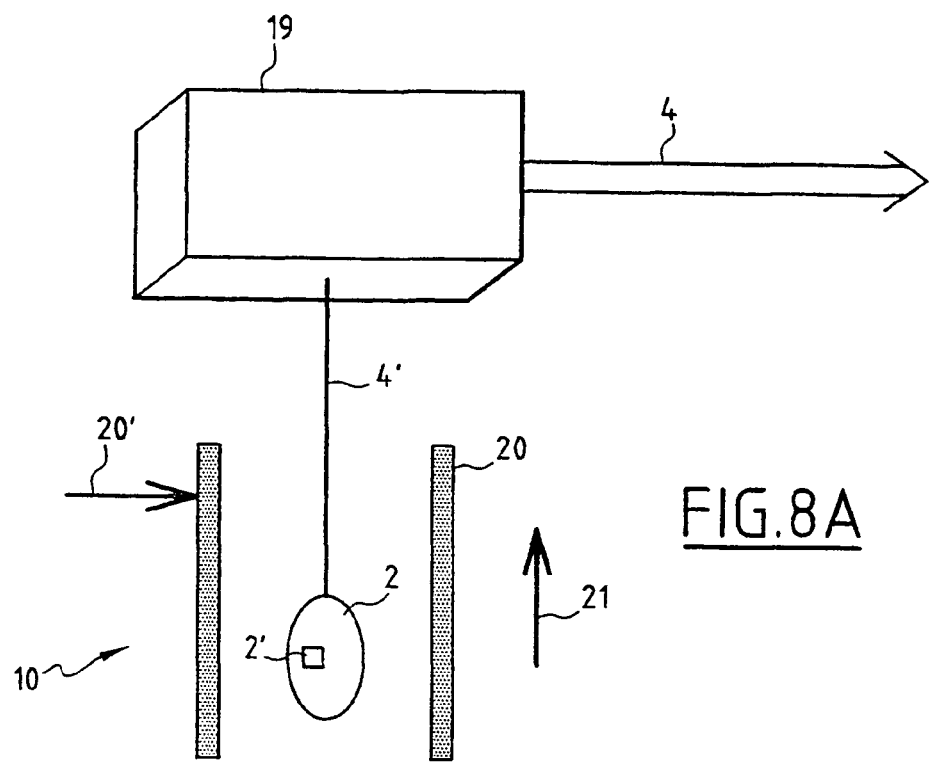
FIG. 8A is a schematic view showing a test device for implementing the method according to the invention and according to a fifth embodiment.

In the case of the device depicted in FIG. 8A, the sensor 2 which can be used for making a level measurement, for example of a liquid in a reservoir, is connected to a measurement sequence comprising a conversion box 19 converting the signal from the sensor 2 and an electric connection line 4 connecting to means for exploiting and displaying the measurements from the sensor.

The device 10 for testing the sensor comprises a magnetic coil 20 which can be supplied with electric current by a supply conductor 20' arranged around the level measurement sensor 2 in such a way that the axis of the magnetic coil 20 is directed along the axis of movement of the sensor 2 as a function of the level of the liquid in the reservoir.

To ensure that the sensor 2 moves in the magnetic field created by the magnetic coil 20, a magnetic core plunger 2' is fixed to the sensor 2.

The sensor 2 and its measurement sequence is tested by supplying the magnetic coil 20 with electric current, so as to move the sensor, for example upward, as depicted by the arrow 21.

The measurement sequence detects a modified signal from the sensor, which signal is analyzed to determine the availability of the sensor 2.

Figure 8B:
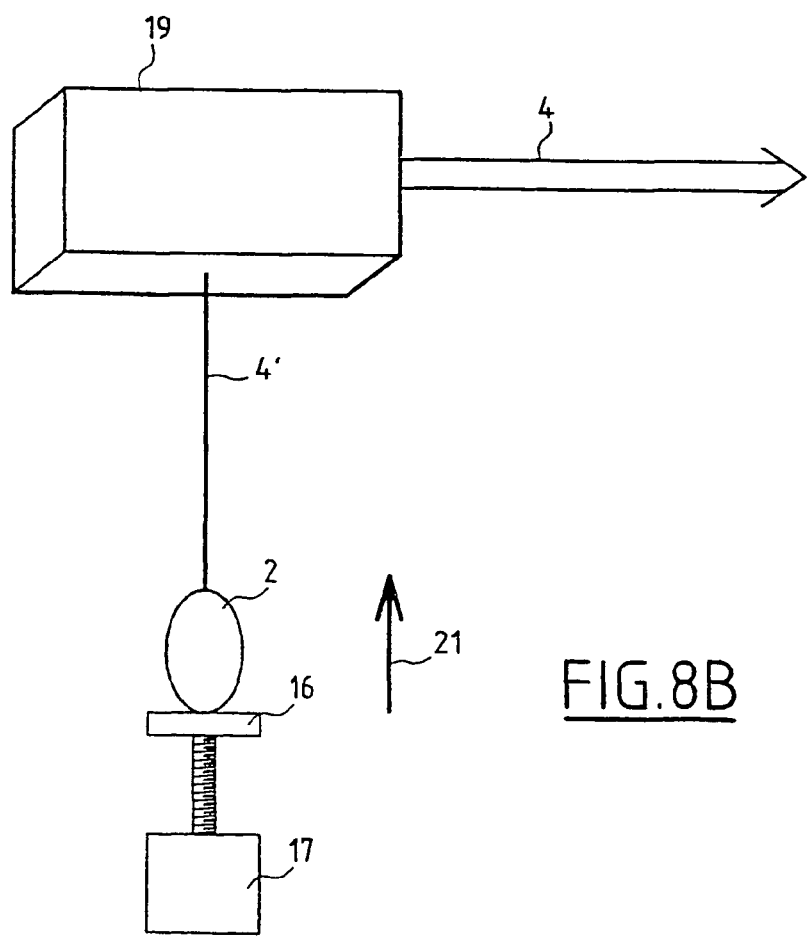
FIG. 8B is a schematic view showing an alternative form of the test device depicted in FIG. 8A.

In an alternative form of the embodiment depicted in FIG. 8B, the sensor 2 or its sensitive element is moved via a piston 16 actuated by a servomotor 17 as depicted by the arrow 21.

In all the envisioned scenarios, the checking device and method according to the invention make it possible for the sensor and its measurement sequence to be checked simultaneously.

When it is possible quantitatively to determine the perturbations of a thermodynamic parameter measured by the sensor, when implementing the method according to the invention, and the evolution of the parameter during testing, it becomes possible to perform calibration tests on the sensor, without removing the sensor from the installation. This is because correspondence between the signals from the sensor and the values of the parameter which are obtained during one or more test operations by the method of the invention can be obtained.

It is thus possible to reduce the frequency of the sensor maintenance and calibration operations that require removing the sensor from the installation.

The invention is not restricted to the embodiments described.

Thus, other means may be envisioned for introducing a perturbation of fluid origin either into the fluid from which the thermodynamic characteristics are measured or onto the sensor used for this measurement.

The invention claimed is:

1. A method for checking a sensor and a measurement sequence associated with the sensor, comprising the steps of:
    providing an industrial installation equipped with the sensor, the industrial installation having a normal operation mode, the sensor, during the normal operation mode, being connected so that it can monitor a thermodynamic parameter of a monitored fluid circulating in the industrial facility;
    monitoring said thermodynamic parameter of said monitored fluid circulating in the industrial installation, by sensing said fluid using the sensor while the industrial installation is in normal operating mode and without changing the connection of the sensor, and by collecting and processing an electric signal emitted by the sensor using the measurement sequence;
    producing a perturbation of fluid origin of said thermodynamic parameter of said monitored fluid while the installation continues being in normal operating mode and the fluid circulates in the installation and the sensor continues sensing said monitored fluid circulating in the installation without changing the connection of the sensor, in order to act on a sensitive element of the sensor and cause a modification of the electric signal emitted by the sensor;
    collecting and analyzing said modified signal from the sensor using the measurement sequence;
    checking the availability of the sensor by checking whether the electrical signal emitted by the sensor, collected and analyzed using the measurement sequence, is modified by the perturbation of fluid origin.

2. The method as claimed in claim 1, wherein the perturbation of fluid origin is produced by circulating a fluid at a speed ($V_A$) in at least one instrumentation pipe run on which the sensor is arranged, in communication with a fluid circuit of the industrial installation, so as to produce an increase or decrease in pressure at a point adjacent to the sensor in the supply pipe run.

3. The method as claimed in claim 2, wherein the fluid is circulated at the speed ($V_A$) in the instrumentation pipe run from a cylinder connected in closed circuit to the instrumentation pipe run and comprising a piston delimiting a first chamber and a second chamber inside the cylinder, which chambers are each connected to the instrumentation pipe run by a pipe having a diameter appreciably greater than the diameter of the instrumentation pipe run.

4. The method as claimed in claim 2, wherein the fluid is circulated at the speed ($V_A$) in the instrumentation pipe run by the movement of a piston, through which there passes a calibrated orifice, in the instrumentation pipe run.

5. The method as claimed in claim 2, wherein the fluid is circulated at the speed ($V_A$) in the instrumentation pipe run using a fluid circuit comprising at least one pipe connected to the supply pipe run the diameter of which is appreciably greater than the diameter of the supply pipe run.

6. The method as claimed in claim 1, wherein a perturbation is created in a fluid inside a reservoir in a zone adjacent to a tapping connecting an instrumentation pipe run, on which the sensor is arranged, to the reservoir.

7. The method as claimed in claim 6, wherein a raised pressure is produced in the reservoir in the zone adjacent to the tapping connecting the instrumentation pipe run, by injecting a fluid into the reservoir in the zone adjacent to the tapping of the instrumentation pipe run.

8. The method as claimed in claim 6, wherein a reduced pressure is produced in the zone adjacent to the tapping of the instrumentation pipe run by ejecting or withdrawing fluid through a venturi the throat of which is connected to the tapping of the instrumentation pipe run.

9. The method as claimed in claim 1, wherein the physical perturbation exerted upon the sensor is a movement of the sensor giving rise to a perturbation of the signal from the sensor.

10. The method as claimed in claim 1, wherein perturbations in the thermodynamic parameter which are due to the perturbation of fluid origin and the corresponding signals from the sensor are quantitatively determined in order to calibrate the sensor.

11. The method according to claim 1, wherein the industrial installation is a nuclear power station.

12. The method according to claim 1, in which the sensor is influenced at several levels successively by perturbations in order to calibrate the sensor.

13. An industrial installation having a normal operation mode, the industrial installation including:
a circuit containing a monitored fluid,
a sensor for monitoring, during the normal operation mode, a thermodynamic parameter of said monitored fluid contained in the circuit and emitting an electric signal function of said thermodynamic parameter,
a measurement sequence associated with the sensor for collecting and processing said electric signal emitted by the sensor,
an instrumentation pipe run connecting the sensor to the circuit at least during the normal operation mode,
means for producing a perturbation of fluid origin of said thermodynamic parameter of said monitored fluid while the installation is operating in normal operation mode and the sensor continues sensing said monitored fluid contained in the circuit, said means for producing a perturbation of fluid origin including means for circulating a fluid in the instrumentation pipe run.

14. The device as claimed in claim 13, wherein the means of perturbing a thermodynamic parameter of the fluid in the instrumentation pipe run consists of a cylinder comprising two chambers separated from one another by a moving piston, each of the chambers being connected to the instrumentation pipe run, in such a way that the cylinder is connected in closed circuit to the instrumentation pipe run and means for moving the piston inside the cylinder so as to circulate a fluid with which the cylinder and the instrumentation pipe run are filled inside a length of the instrumentation pipe run delimited between a branch of a first pipe connecting a first chamber of the cylinder to the instrumentation pipe run and a second pipe connecting a second chamber of the cylinder to the instrumentation pipe run at points situated respectively in a position adjacent to and in a position further away from the sensor on the instrumentation pipe run.

15. The device as claimed in claim 14, wherein the pipes have a diameter greater than the diameter of the instrumentation pipe run.

16. The device as claimed in claim 14, wherein the device for moving the piston inside the cylinder consists of a magnetic coil placed around the cylinder and connected to a means for supplying electrical current, and a magnetic core plunger connected to the piston inside the cylinder.

17. The device as claimed in claim 14, wherein the means of moving the piston consists of a rod passing through a wall of the cylinder and connected, outside the cylinder, to a motor for moving the rod and the piston in the axial direction of the cylinder.

18. The device as claimed in claim 13, wherein the device for perturbing the fluid in the instrumentation pipe run consists of a fluid-circulation circuit comprising at least one pipe connected to the instrumentation pipe run and having a diameter appreciably greater than the diameter of the instrumentation pipe run.

19. The device as claimed in claim 18, wherein the pipe is connected to a fluid reservoir and in that a shut-off valve is arranged on the pipe, between the fluid reservoir and the supply pipe run.

20. The device as claimed in claim 13, wherein the means for producing a perturbation of the fluid origin comprises a pipe for injecting or drawing a fluid into a reservoir in a zone adjacent to a tapping connecting the instrumentation pipe run, on which the sensor is placed, to the fluid reservoir.

21. The device according to claim 13, wherein the industrial installation is a nuclear power station.

* * * * *